(12) United States Patent
Führer (10) Patent No.: US 11,718,192 B2
(45) Date of Patent: Aug. 8, 2023

(54) PROTECTIVE EARTHING AND COOLING SYSTEM FOR A CHARGING PLUG, CHARGING PLUG AND CHARGING STATION FOR DISCHARGING ELECTRIC ENERGY TO A RECIPIENT OF ELECTRIC ENERGY

(71) Applicant: PHOENIX CONTACT E-MOBILITY GMBH, Schieder-Schwalenberg (DE)

(72) Inventor: Thomas Führer, Blomberg (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 316 days.

(21) Appl. No.: 17/056,946

(22) PCT Filed: Apr. 24, 2019

(86) PCT No.: PCT/EP2019/060483
§ 371 (c)(1),
(2) Date: Nov. 19, 2020

(87) PCT Pub. No.: WO2019/223947
PCT Pub. Date: Nov. 28, 2019

(65) Prior Publication Data
US 2021/0206280 A1    Jul. 8, 2021

(30) Foreign Application Priority Data
May 25, 2018  (DE) .......................... 102018112596.8

(51) Int. Cl.
*B60L 53/16* (2019.01)
*B60L 53/302* (2019.01)
(Continued)

(52) U.S. Cl.
CPC .............. *B60L 53/16* (2019.02); *B60L 53/302* (2019.02); *H01R 13/005* (2013.01); *H01R 24/30* (2013.01); *H01R 2201/26* (2013.01)

(58) Field of Classification Search
CPC ................................ B60L 53/16; H01R 24/30
(Continued)

(56) References Cited

U.S. PATENT DOCUMENTS

2015/0217654 A1* 8/2015 Woo .................. B60L 53/16
320/109
2017/0338006 A1* 11/2017 Gontarz ................ H01B 9/006
(Continued)

FOREIGN PATENT DOCUMENTS

CN     102012105774     10/2013
CN     106104949        11/2016
(Continued)

OTHER PUBLICATIONS

PCT Search Report for corresponding PCT Application No. PCT/EP2019/060483 dated Jul. 8, 2019, 6 pages.
(Continued)

*Primary Examiner* — Suchin Parihar
(74) *Attorney, Agent, or Firm* — Lee & Hayes, P.C.

(57) ABSTRACT

A protective grounding and cooling system for a charging plug includes at least one protective ground conductor contact for galvanic connection to a protective ground conductor, and at least one cooling device for dissipating heat generated in the charging plug. The cooling device is galvanically connected to the protective ground conductor contact. The cooling device has a protective ground conductor connection for at least partial galvanic connection to the protective ground conductor, and in that the protective ground conductor contact, the cooling device and the protective ground conductor connection are arranged such that (Continued)

the protective ground conductor contact is galvanically connected to the protective ground conductor connection by means of the cooling device.

15 Claims, 4 Drawing Sheets

(51) Int. Cl.
 *H01R 13/00* (2006.01)
 *H01R 24/30* (2011.01)
(58) Field of Classification Search
 USPC .......................................................... 320/109
 See application file for complete search history.

(56) References Cited

U.S. PATENT DOCUMENTS

2019/0074620 A1* 3/2019 Moseke .................. B60L 53/16
2019/0074628 A1* 3/2019 Fuehrer .............. H01R 13/5221

FOREIGN PATENT DOCUMENTS

| | | |
|---|---|---|
| CN | 107082030 | 8/2017 |
| DE | 102014015148 | 4/2016 |
| DE | 102016105311 | 9/2017 |
| WO | WO2017162464 | 9/2017 |

OTHER PUBLICATIONS

Ferdi, et al., "Potentialausgleich an Gehiiuse anbindenn—Mikrocontroller.net", Dec. 16, 2014, Retrieved from the Internet: <<https://www.mikrocontroller.net/topic/352709>>, 3 pages.

PCT International Preliminary Report on Patentability for corresponding PCT Application No. PCT/EP2019/060483 dated Dec. 10, 2020, 8 pages.

Chinese Office Action for corresponding Chinese Patent Application No. 201980028090.6 dated Dec. 2, 2022, 8 pages.

* cited by examiner

PROTECTIVE EARTHING AND COOLING SYSTEM FOR A CHARGING PLUG, CHARGING PLUG AND CHARGING STATION FOR DISCHARGING ELECTRIC ENERGY TO A RECIPIENT OF ELECTRIC ENERGY

This Application claims priority to PCT Application No. PCT/EP2019/060483, filed Apr. 24, 2019, which claims priority to German Patent Application Serial No. 102018112596.8, filed May 25, 2018, the contents of each of which is incorporated herein by reference.

The present invention relates to a protective grounding and cooling system for a charging plug. The present invention also relates to a charging plug for coupling to a corresponding connection device and for transmitting electrical energy. The present invention further relates to a charging station for discharging electrical energy to a recipient of electrical energy.

Charging plugs for electrically powered vehicles are known from the prior art which are designed for connection to a corresponding connection device designed as a socket. In this respect, reference is made to the charging plug disclosed in DE 10 2012 105 774 B3. Power contacts are arranged in the charging plug, each of which has a first connection region and a second connection region. The first connection region is designed as a contact socket and is suitable for galvanic connection to a contact pin, the contact pin being galvanically connected to an electrical energy recipient, for example an accumulator of a vehicle. The second connection region of the power contact is designed for galvanic connection to an electrical energy source, for example a charging station, or generally to an electrical supply network. For example, the second connection region can be rigidly connected to a charging line.

Due to the charging current flowing through the power contact, the power contact designed as a power plug-in contact inevitably heats up due to ohmic current heat losses. However, the heating of the power contact is restricted to a limit temperature increase. For example, according to the IEC 62196-3 standard, the limit temperature increase is restricted to 50 K. This in turn leads, in mostly standardized plug-in connector geometries, to a maximum charging current of up to 200 A continuous load.

In contrast, intermittent charging of an accumulator requires higher charging currents of 350 A and more over limited periods of time in order to charge the accumulator in a desired short time. This in turn leads to a temporary heating of the power contacts which is above the limit temperature increase. The line cross-section of the power contact cannot be increased arbitrarily, as the plug-in connector geometries are standardized and moreover the smallest possible amount of conductive material, usually copper, should be used for the power contacts.

It is also known from the prior art to counteract heating of the power contacts by integrating a cooling system into the charging plug. Such a cooling system can dissipate heat generated in the charging plug during operation. In this case, the cooling system provided in the charging plug can actively cool the charging plug, for example, and conduct the heat out of the charging plug inter alia by means of a coolant. In this respect, reference is made to the charging plug disclosed in DE 10 2016105 311 A1, in which a cooling device in contact with the power contacts for the purpose of heat exchange is provided in the charging plug housing for dissipating heat generated in the charging plug. Due to the standardized plug-in connector geometries and the usability necessary for operating a charging plug, the space available in a charging plug for such cooling systems is limited.

For safe use, the above-mentioned charging plugs are also provided with protective systems or protective grounding systems. For this purpose, a protective ground conductor system is installed, in which a protective ground conductor contact arranged in the charging plug ensures that safe grounding can take place by means of the protective ground conductor contact in the event of a fault. In the charging plug known from DE 10 2016105 311 A1, a protective ground conductor contact or PE contact (also known as a grounding contact) is provided, for example, which is electrically contacted or galvanically connected to a protective ground conductor or neutral conductor arranged in the charging cable by means of wiring extending through the charging plug housing. The protective ground conductor contact is also electrically/galvanically connected to the cooling device at least in part. The protective ground conductor contact thus provides the necessary grounding of the charging plug via its direct connection to the protective ground conductor or neutral conductor.

Due to the standardized plug-in connector geometries and the usability necessary for operating a charging plug, the space available in a charging plug for such protective grounding systems is limited. Furthermore, due to the wiring extending through a large part of the charging plug housing, the connection of the protective ground conductor and the protective ground conductor contact requires improvement in terms of both space requirement and operational safety, as the wiring takes up installation space on the one hand and on the other hand is a fault source for an interruption of the protective ground conductor system due to extending through the charging plug housing.

The problem addressed by the present invention is that of providing a protective grounding and cooling system for a charging plug which allows increased charging currents with restricted heating, therefore having increased current-carrying capacity, and which simultaneously allows a more compact and safer design of the charging plug.

This problem is solved by a protective grounding and cooling system having the features of claim 1. Advantageous embodiments are described in the claims dependent on claim 1.

The problem addressed by the present invention is also that of providing a charging plug by means of which increased current charges can be transferred without excessive heating of the charging plug, and which charging plug has a more compact and safer design and is therefore improved in terms of usability and operational safety.

This problem is solved by a charging plug having the features of claim 10. Advantageous embodiments of the charging plug are described in the claims dependent on claim 10.

Finally, the problem addressed by the present invention is that of providing a charging station for discharging electrical energy to a recipient of electrical energy, by means of which station increased peak charging currents can be transmitted, and which station furthermore allows simplified usability and increased operational safety.

This problem is solved by a charging station having the features of claim 15.

More specifically, the problem addressed by the present invention is solved by a protective grounding and cooling system for a charging plug, comprising at least one protective ground conductor contact for galvanic connection to a protective ground conductor, and at least one cooling device for dissipating heat generated in the charging plug, the cooling device being galvanically connected to the protective ground conductor at least in part. The protective grounding and cooling system is characterized in that the cooling device comprises a protective ground conductor connection for at least partial galvanic connection to the protective ground conductor, and in that the protective ground conductor contact, the cooling device and the protective ground conductor connection are arranged such that the protective ground conductor contact is galvanically connected to the protective ground conductor connection by means of the cooling device.

Greater charging currents can be transmitted by means of the protective grounding and cooling system according to the invention, as the heat generated in a charging plug can be effectively dissipated by means of the cooling device. In correspondingly designed charging plugs, the temperature increase of the power contacts is therefore restricted. The protective grounding and cooling system is particularly advantageous in terms of size and thus usability, since the grounding provided for protection and the necessary cooling are provided by a single, common system.

The cooling device is therefore integrated in the protective ground conductor system and the connection of the protective ground conductor contact to the protective ground conductor system is established by connection to the protective ground conductor only by means of said cooling device. The galvanic connection between the protective ground conductor contact and the protective ground conductor connection and thus ultimately to the protective ground conductor is implemented by the cooling device being arranged between the protective ground conductor contact and the protective ground conductor connection and connecting these to one another. There is therefore no direct galvanic connection between the protective ground conductor contact and the protective ground conductor. Consequently, the cooling device establishes the galvanic connection between the protective ground conductor contact and the protective ground conductor to be connected, namely via the provided protective ground conductor connection, as a result of which additional wiring between the protective ground conductor and the protective ground conductor contact is not necessary. This also removes the need for separate guiding of the protective ground conductor or corresponding wiring through a large part of the charging plug housing, and the safety of the entire system is also increased. Separate wiring can be dispensed with and the existing cooling device can be used to implement the necessary connection of the protective ground conductor contact to the protective ground conductor.

A protective ground conductor contact is therefore to be understood to mean a grounding contact. The protective power contact is therefore provided for grounding the protective grounding and cooling system and thus also for grounding the charging plug. The protective ground conductor contact can also be referred to as a PE contact or a grounding contact element.

A galvanic or electrical connection is understood to mean a connection which allows an electric current to flow or be transferred through the galvanically connected components during operation of the system or the charging plug.

A cooling device is understood to mean a device which can dissipate the heat generated in the system during operation in a passive or active manner, for example by providing a coolant circuit with a liquid or gaseous coolant.

When the protective grounding and cooling system is used in a charging plug, the protective ground conductor connection or neutral conductor connection of the cooling system is used to connect a protective ground conductor or neutral conductor to said protective ground conductor connection. For this purpose, the protective ground conductor connection is adapted to the protective ground conductor to be correspondingly connected, which can usually be designed having cross-sections of from 25 mm$^2$ to 50 mm$^2$.

Because the protective ground conductor contact, the cooling device and the protective ground conductor connection are arranged such that the protective ground conductor contact is galvanically connected to the protective ground conductor connection by means of the cooling device in the first place, the protective ground conductor system required for safety during operation of the charging plug is provided. In the correspondingly designed charging plug, the protective ground conductor system is thus provided by the connection of the protective ground conductor to the protective ground conductor connection, such that, viewed from the protective ground conductor to be connected, the protective ground conductor is galvanically connected to the protective ground conductor connection, thus connected at least in part to the cooling device and thus to the protective ground conductor contact. In the protective grounding and cooling system according to the invention, the protective ground conductor connection, the cooling device, the protective ground conductor and the protective ground conductor are therefore galvanically interconnected at least in part in series. The cooling device is therefore a necessary component of the protective ground conductor system. The galvanic connection of the protective ground conductor contact to the protective ground conductor is realized only by the cooling device.

At the same time, the number of necessary components for providing the cooling function and for realizing the protective ground conductor system is reduced or these components are arranged in a more space-saving manner, such that the protective grounding and cooling system according to the invention requires less installation space and better usability of a charging plug is thus made possible due to a smaller size. The space required in vehicles for a charging plug or a corresponding charging plug-in connector is also reduced.

An at least partial galvanic connection, in the context of the galvanic connections to the cooling device, is understood to mean that the cooling device does not have to form a galvanic connection to the connected elements in its entirety. It is sufficient for the cooling device to be galvanically connected in part to the connected elements. The cooling device can therefore also comprise portions which are not galvanically connected to these connected elements. These portions are, for example, electrically insulated parts of the cooling device which, in other words, do not participate in the galvanic connection of the cooling device. In the context of the present invention, it is essential that the cooling device, due to its at least partial galvanic connection to the protective ground conductor contact on one side and the protective ground conductor connection on the other side and thus ultimately to the protective ground conductor, ensures that the protective ground conductor contact and the protective ground conductor connection and thus the protective ground conductor are galvanically interconnected. Without the cooling device, there would be no galvanic connection between the protective ground conductor contact and the protective ground conductor. The fact that parts of the cooling device do not participate in this galvanic connection is irrelevant to the present invention and is expressed by the fact that this connection is described as an at least partial galvanic connection. Correspondingly, the cooling device can also be used to cool the power contacts and dissipate the heat generated in the charging plug from the charging plug without itself being in direct contact with the power contacts in the sense of a galvanic connection.

Preferably, in the protective grounding and cooling system the cooling device is designed as a fluid-cooled heat sink. The cooling system can therefore be an actively cooled system, for example using a coolant flowing through the heat sink. The cooling device can therefore be actively cooled by a coolant flow flowing through the heat sink. In this case, the heat sink can comprise a metal or be made of metal, so that the heat generated for example by the power contact in the charging plug is particularly effectively dissipated by a cooling circuit in the heat sink, and therefore the temperature of the power contact is effectively reduced at the same time.

Any cooling fluid, both liquid and gaseous, can be used as the coolant. For example, water, water/glycol mixtures, insulating oil and/or inert cooling liquids, such as ketones, in particular fluorinated ketones, can be used as the coolant. Furthermore, nitrogen can also be used as a cooling fluid. However, it is also possible for compressed air to be used as the cooling fluid; compressed air is understood to mean breathing air under pressure. The coolant dissipates heat generated during operation of the system.

Consequently, when using the protective grounding and cooling system according to the invention in a charging plug, greater charging currents can be transferred without excessive heating of the power contact(s) while maintaining the line cross-section of the power contact(s) in the charging plug. This provides a system having increased current-carrying capacity with a simultaneously smaller size.

According to an advantageous embodiment of the protective grounding and cooling system, the cooling device is designed as a heat sink made substantially of a thermally conductive material, in particular a metal material. The heat generated in the system during operation can thus be transported away from the system particularly well via the heat sink, and optionally furthermore transferred to a coolant. The system thus allows higher charging currents to be transferred in a charging plug, as a result of which a system having increased current-carrying capacity with a simultaneously smaller size is provided.

For example, aluminum, die-cast aluminum, copper, brass, iron, steel or alloys of these metals can be used as the metal.

Further preferably, the protective ground conductor contact can be directly connected to the cooling device at a front face of the cooling device for at least partial galvanic connection to the cooling device. This ensures a compact and safe arrangement of the protective grounding and cooling system in a charging plug. No additional components for connecting the protective ground conductor contact to the cooling device are necessary.

A front face of the cooling device is understood to mean the face which is remote from or opposite the charging line or the charging or supply cable in the assembled state of the charging plug. The front face of the cooling device is therefore also associated with a front face of the entire charging plug in the assembled state of the charging plug, the front face of the charging plug being the face via which the charging plug is coupled to a corresponding connection device. Because the cooling device has a protective ground conductor contact mounted on its front face, a compact design of the protective grounding and cooling system and thus of the charging plug is achieved, which is particularly advantageous for the narrow installation space available.

In the charging plug, the face opposite the front face of the charging plug can also be referred to as the cable-side end of the charging plug. The face opposite the front face of the cooling device can therefore also be referred to as the cable-side end of the cooling device.

According to another advantageous embodiment of the protective grounding and cooling system, the protective ground conductor contact can be screwed into the front face of the cooling device. This achieves a structurally simple and simultaneously safe connection of the protective ground conductor contact to the cooling device and thus a structurally simple protective grounding and cooling system for a charging plug with increased safety.

According to another advantageous embodiment of the protective grounding and cooling system, the protective ground conductor connection can be connected to the cooling device by means of a screw connection. This ensures safe integration of the cooling device into the protective ground conductor system. A safe protective grounding and cooling system and thus a charging plug of increased safety is achieved. Preferably, the screw connection can be realized using additional components, in particular by screwing using a tooth lock washer, in order to further increase the safety of the connection.

Further preferably, the protective ground conductor connection can be designed as a cable ring lug. This allows a simplified, but safe and thus effective connection of the cooling device to the protective ground conductor, and achieves a safe protective grounding and cooling system and thus a charging plug of increased operational safety.

For this purpose, the cable ring lug can preferably comprise a substantially annular conductor portion for enclosing and receiving the protective ground conductor and a flat connection portion for connecting to the cooling device. Preferably, the flat connection portion can be connected to the cooling device by means of the screw connection and the protective ground conductor can be connected to the cable ring lug by crimping in the annular conductor portion. For this purpose, the protective ground conductor can be plugged and crimped into the cable ring lug, in particular into the annular conductor portion thereof.

According to another advantageous embodiment of the protective grounding and cooling system, the protective ground conductor connection can be arranged on a cable-side end portion of the cooling device remote from the front face of the cooling device. This produces a particularly simplified, space-saving arrangement of the protective grounding and cooling system, as a result of which a compact charging plug can be achieved. As the protective ground conductor connection is mounted on the cooling device at the cable-side end remote from the front face, said connection is already located where the protective ground conductor must also be connected in the assembled state of the charging plug. This achieves a compact design. Furthermore, a guiding of the protective ground conductor in the charging plug to the protective ground conductor connection which would otherwise take up installation space is avoided, as a result of which a charging plug having increased operational safety is achieved.

Preferably, the cable-side end portion of the cooling device can be angled with respect to a plug-in direction defined by the protective ground conductor contact. A protective grounding and cooling system and thus a charging plug that is easier to handle are therefore achieved.

The plug-in direction is understood to mean the direction in which the charging plug, in the assembled state, is coupled to a corresponding connection device as intended.

The plug-in direction usually extends in parallel to a direction defined by the power contact(s) and in parallel to a direction defined by the protective ground conductor contact. This also means that the plug-in direction usually extends perpendicularly with respect to the front face of the charging plug or a front contact face of the charging plug housing and perpendicularly with respect to the front face of the cooling device.

Usually, the charging or supply cable, which can also comprise the protective ground conductor, connected to the cable-side end of a charging plug can extend downwards due to gravitational force, for example toward the ground in the case of a charging or supply cable attached to a charging station. Because the cable-side end portion of the cooling device is angled with respect to the plug-in direction, in particular downward, the corresponding protective grounding and cooling system and the corresponding charging plug are improved in terms of usability and safety. The charging or supply cable can thus be directly connected to the cable-side end portion and unnecessary guiding of conductors, such as the protective ground conductor, to the corresponding connections in the charging plug, such as the protective ground conductor connection, is avoided. This achieves a protective grounding and cooling system that is improved both in terms of size and in terms of operational safety.

In general, the protective grounding and cooling system can of course also comprise more than one protective ground conductor contact for galvanic connection to a protective ground conductor and/or more than one cooling device for dissipating heat generated in the charging plug. The heat generated in the system and in the charging plug can be dissipated more effectively and/or in a more targeted manner by using a plurality of cooling devices. A plurality of protective ground conductor systems can be realized by a plurality of protective ground conductor contacts. In the protective grounding and cooling system according to the invention, at least one protective ground conductor contact is, by means of its at least partial galvanic connection to the cooling device, galvanically connected via the protective ground conductor connection to the protective ground conductor as described in the first place and not directly galvanically connected to this protective ground conductor itself.

The problem addressed by the present invention is also solved by a charging plug for coupling to a corresponding connection device and for transmitting electrical energy, comprising at least one power contact having a first connection region for galvanic connection to an electrical energy recipient and having a second connection region galvanically connected to a charging line, the charging plug being characterized in that it has at least one above-described protective grounding and cooling system arranged in a charging plug housing, the protective ground conductor connection of the cooling device being galvanically connected to a protective ground conductor.

Of course, the charging plug can also have two or more power contacts arranged in the charging plug housing, each of which has a first connection region for galvanic connection to an electrical energy recipient and a second connection region galvanically connected to a charging line. The power contact can also be referred to as an electrical connection body. The charging line(s) can be part of a charging cable or supply cable.

The first connection region can be galvanically connected to a plug-in contact. Preferably, the first connection region is designed as a contact pin. The first connection region of the power contact(s) can also be referred to as a front connection region or front connection portion or as a front functional region. The recipient of electrical energy or electrical energy recipient may be an accumulator, for example. In particular, the accumulator may be a vehicle battery of an electrically powered vehicle.

The second connection region of the power contact is usually electrically/galvanically connected to a charging line and is therefore connected to an electrical energy source for galvanic connection. The second connection region can also be referred to as a rear connection region or rear connection portion or as a rear functional region.

The charging plug according to the invention allows increased charging currents while maintaining predetermined line cross-sections, without excessive heating of the charging plug and components within the charging plug, in particular the power contacts, during a current transfer. Due to the connected protective ground conductor and the protective ground conductor system thus present, the protective grounding and cooling system in the charging plug ensures safe operation of the charging plug with a simultaneously small design and thus improved usability of the charging plug.

The charging plug can preferably be designed such that the charging line and the protective ground conductor are arranged together in a supply cable. This makes it possible to realize the connection of the protective ground conductor to the protective ground conductor connection and the connection of the charging line to the second connection region by means of the connection of one supply cable to the charging plug. This results in a charging plug that has a simplified design and is advantageous in terms of size. The supply cable can also be referred to as a charging cable and therefore both the charging line and the protective ground conductor can be part of the charging cable.

According to another advantageous embodiment of the charging plug, the charging plug housing can be formed of a cable-side portion nearer the charging line and the protective ground conductor and a connector face portion remote from the charging line and the protective ground conductor, it being possible to plug the connector face portion onto the front face of the cable-side portion in a plug-in direction defined by the protective ground conductor contact.

In a correspondingly designed charging plug, the charging plug housing can thus be designed substantially in two parts, comprising a cable-side portion and the connector face portion. The fact that the connector face portion can be plugged onto the cable-side portion results in a simplified design of the charging plug of smaller size. The production and the mounting and removal of a correspondingly designed charging plug is possible in a simplified manner. In this case, the connector face portion can also be secured on the cable-side portion by further securing means, for example by screws.

Further preferably, the cooling device can be arranged in the cable-side portion of the charging plug housing and the front face of the protective ground conductor contact can penetrate a base portion of the connector face portion of the charging plug housing. This achieves a simplified design of a charging plug of further reduced size.

According to another advantageous embodiment of the charging plug, the protective ground conductor contact can be sealed against the charging plug housing by means of a seal extending between the protective ground conductor contact and the base portion of the connector face portion. This allows a charging plug with increased safety, as the charging plug housing is sealed against the protective ground conductor contact and thus the protective ground conductor system. The seal can be used to electrically insulate the charging plug housing from the protective ground conductor contact.

The problem addressed by the present invention is further solved by a charging station for discharging electrical energy to a recipient of electrical energy, the charging station being characterized in that this charging station comprises an above-described charging plug which is electrically connected to the charging station by means of a supply cable.

A correspondingly designed charging station is improved in terms of usability and operational safety due to the used charging plug and protective grounding and cooling system having a more compact, more easily usable and safer design in accordance with the previously described aspects.

Further advantages, details and features of the invention can be found in the following in the described embodiments. In the drawings.

In the following description, the same reference signs denote the same components or features, so that a description of a component with reference to one drawing also applies to the other drawings, thus avoiding repetitive description. Furthermore, individual features which have been described in connection with an embodiment can also be used separately in other embodiments.

Figure 1:
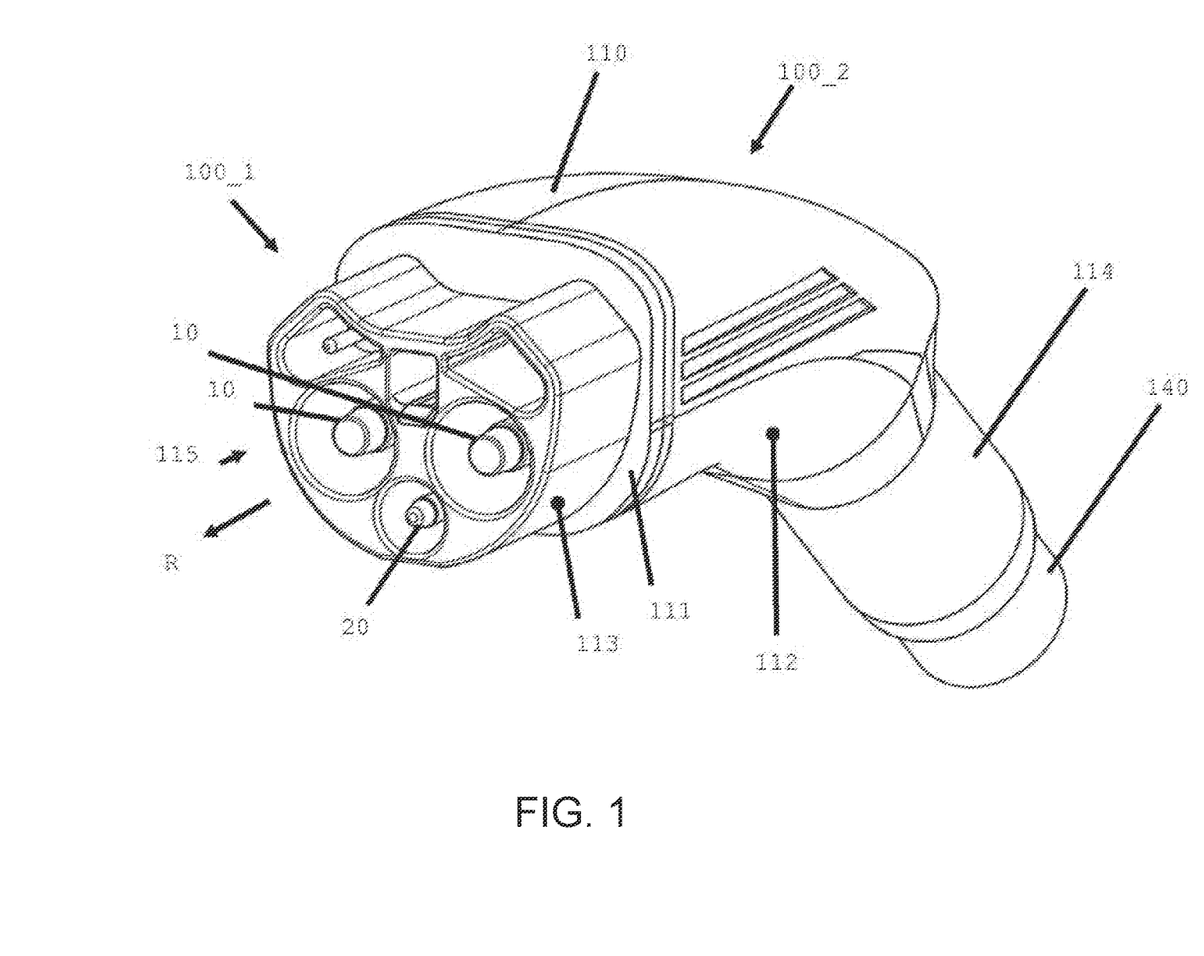
FIG. 1 is a perspective view of a charging plug according to the invention.

FIG. 1 also shows a charging plug 100 according to the invention for coupling to a corresponding connection device (not shown in the drawings) and for transmitting electrical energy. The charging plug 100 can also be referred to as a plug-in connector or charging plug-in connector.

As can be seen in FIG. 1, the charging plug 100 is connected at one end to a supply cable 140, which can also be referred to as a charging cable, by means of which the charging plug 100 is or can be connected to a charging station (not shown). The supply cable 140 can comprise a plurality of conductors or leads, inter alia a protective ground conductor or neutral conductor for grounding the charging plug 100 and a charging line for supplying power to the charging plug 100.

The charging plug 100 comprises a charging plug housing 110 (or charging plug-in connector housing) which is formed of a connector face portion 111 and a cable-side portion 112. In this case, the connector face portion 111 is arranged on the side remote from or opposite the charging line and the protective ground conductor, i.e. also the supply cable 140, while the cable-side portion 112 is arranged on the side nearer the charging line and the protective ground conductor or the supply cable 140. The connector face portion 111 of the charging plug housing 110 has a base portion 113 and is designed such that it can be plugged onto the cable-side portion 112 of the charging plug housing 110. In order to mount the charging plug 100, the connector face portion 111 can be plugged onto the front face of the cable-side portion 112, counter to a plug-in direction R of the charging plug 100.

The cable-side portion 112 of the charging plug housing 110 comprises a cable connection portion 114 at one end or on the cable side, the cable connection portion 114 being used to connect and guide the supply cable 140. The end of the supply cable 140 on the charging plug side is introduced into the cable connection portion 114 and is enclosed thereby.

The charging plug 100 has a front region 100_1 and a rear region 100_2. A front contact face 115 of the charging plug housing 110 or charging plug 100 (also referred to as the front face of the charging plug) can be inserted into a charging socket (not shown) for example of an electrically powered motor vehicle.

The charging plug 100 also comprises two power contacts 10 which can be seen in FIG. 1 in the connector face portion 111 and in the front region 100_1, respectively. The power contacts 10 each have a first connection region (not shown in detail) designed as a contact pin, which region is designed for galvanic connection to an electrical energy recipient, for example a battery of an electrically powered vehicle. More specifically, the contact pin is designed for receiving a contact socket (not shown in the drawings).

Each power contact 10 further comprises a second connection region which is designed for galvanic connection to a charging line arranged in the supply cable 140. The charging line is in turn connected to an electrical energy source (not shown). This electrical energy source may be, for example, a charging station for an electrically powered motor vehicle. As the second connection region of the power contact 10 is designed to be galvanically connected to a charging line, a charging current can be transferred via the power contact 10 by inserting the contact pin (first connection region) into a contact socket (not shown in the drawings).

The first connection region of the power contacts 10 can therefore also be referred to as a front connection region or front connection portion or as a front functional region, while the second connection region can also be referred to as a rear connection region or rear connection portion or as a rear functional region.

It is also clear from FIG. 1 that the charging plug 100 has a protective ground conductor contact 20. The protective ground conductor contact 20 (also referred to as a PE contact or grounding contact element) is used for the safety of the charging plug 100 during operation, specifically the necessary grounding of the charging plug 100, and is therefore a component of a protective system or protective grounding system. For this purpose, the protective ground conductor contact 20 is galvanically connected, in a manner described in more detail below, to a protective ground conductor 120 (not shown in FIG. 1) extending in the supply cable 140, such that the protective ground conductor contact 20 is grounded by means of the protective ground conductor 120. The protective ground conductor system required for the operational safety of the charging plug is thus realized. The protective ground conductor contact 20 is therefore part of the protective grounding and cooling system according to the invention for the charging plug 100 and is arranged, in the assembled state of the charging plug 100, at the bottom of the front contact face 115 of the charging plug housing 110 or charging plug 100 in the embodiment shown.

Figure 2A:
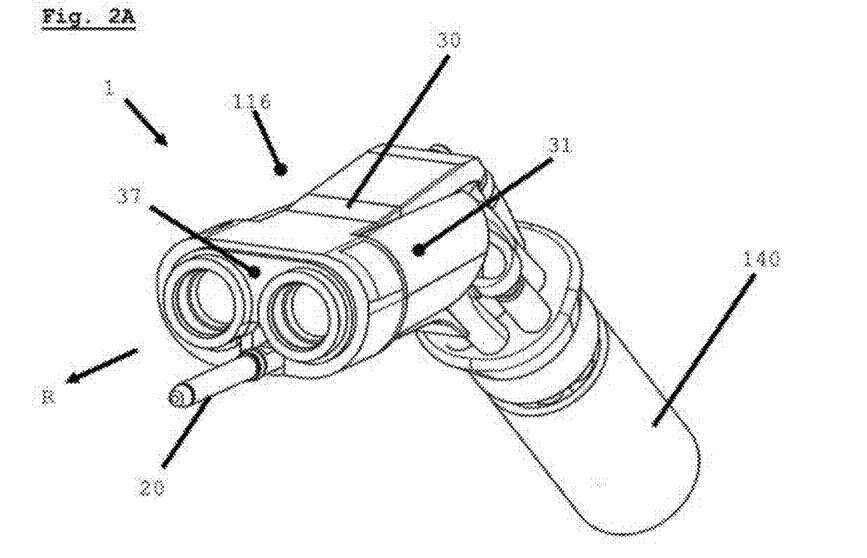
FIG. 2A is a perspective view of the protective grounding and cooling system according to the invention, which is arranged in the charging plug shown in FIG. 1, connected to a supply cable.
Figure 2B:
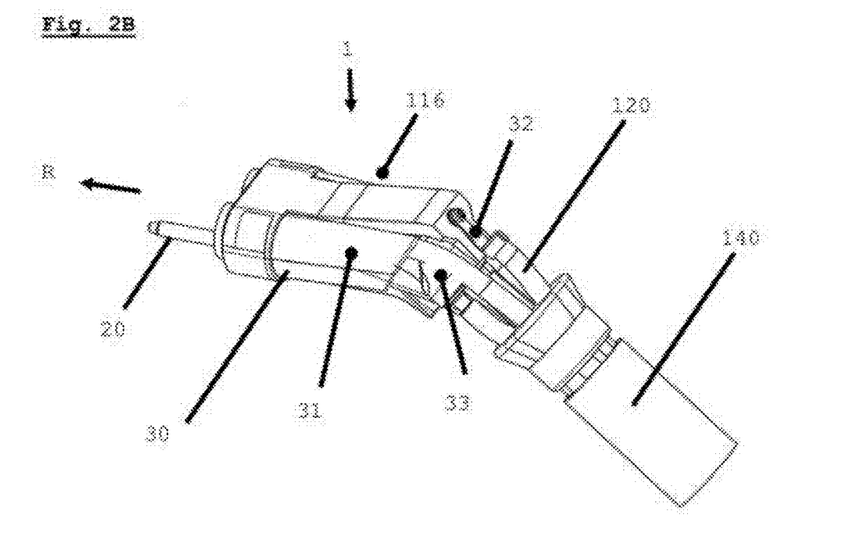
FIG. 2B shows the protective grounding and cooling system from FIG. 2A viewed from the rear at an angle.

FIGS. 2A and 2B show the protective grounding and cooling system 1 according to the invention for the charging plug 100 in a state in which it is connected to the supply cable 140. For the sake of clarity, the illustrations of the previously shown charging plug housing 110 and the power contacts 10 of the charging plug 100 have been omitted, so that the internal parts of the charging plug 100 can be seen. The protective grounding and cooling system 1 is arranged substantially in a charging plug housing interior 116 of the charging plug 100.

The protective grounding and cooling system 1 comprises the protective ground conductor contact 20 for the purpose of grounding the system and the charging plug 100, and a cooling device 30 for dissipating heat generated in the charging plug (100), more specifically generated due to ohmic current heat losses in the power contacts 10.

For this purpose, the cooling device 30 comprises a heat sink 31 which is substantially made of metal, for example aluminum and/or copper and/or iron and/or steel and/or bronze, etc. The cooling device 30 or the heat sink 31 is designed to dissipate heat generated in the charging plug 100, more specifically in the charging plug housing interior 116, in particular due to ohmic current heat losses in the power contacts 10, i.e. is designed to ensure cooling of the charging plug housing interior 116 and the power contacts 10. The heat sink 31 can also be actively cooled by a coolant, i.e. a fluid-cooled heat sink 31 and thus a fluid-cooled charging plug 100 are also possible.

The cooling device 31 also has a protective ground conductor connection 32 for at least partial galvanic connection to a protective ground conductor 120. For this purpose, the protective ground conductor connection 32 arranged on the cable-side end portion 33 of the cooling device 30 is in the form of a cable ring lug and comprises, as can be seen more clearly in FIGS. 3A and 3B, an annular conductor portion 35 and a flat connection portion 34.

The annular conductor portion 35 encloses the protective ground conductor 120 in the assembled state of the charging plug 100 for the purpose of receiving the protective ground conductor 120 in the protective ground conductor connection 32 and thus for the purpose of partial galvanic connection of the protective ground conductor 120 to the cooling device 30 (FIG. 2B). The protective ground conductor usually has an in particular circular cross-section of from 25 mm$^2$ to 50 mm$^2$. Accordingly, the annular conductor portion 35 is usually designed having an inner cross-section of from 25 mm$^2$ to 50 mm$^2$. In order to realize the connection between the protective ground conductor 120 and the protective ground conductor connection 32, the protective ground conductor 120 can be crimped in the annular conductor portion 35. For this purpose, the protective ground conductor 120 can be inserted into the cable ring lug, in particular in the annular conductor portion 35 thereof, and connected by means of crimping.

The flat connection portion 34 of the protective ground conductor connection 32, which is designed as a cable ring lug, is therefore used to connect the protective ground conductor connection 32 to the cooling device 30. The protective ground conductor connection 32 is connected to the cooling device 30, more specifically to the cable-side end portion 33 of the cooling device 30, by means of a screw connection 36 via this flat connection portion 34.

The protective ground conductor 120 is galvanically connected at least in part to the cooling device 30 via the connection of the protective ground conductor 120 to the protective ground conductor connection 32 of the cooling device 30, as shown in FIG. 2B. As can be more clearly seen in FIG. 2A, the protective ground conductor contact 20 is also galvanically connected to the cooling device 30 at least in part. This is realized in the embodiment shown by the protective ground conductor contact 20 being directly connected to the cooling device 30 at a front face 37 of the cooling device 30. More specifically, the protective ground conductor contact 20 is screwed into the front face 37 of the cooling device 30.

The protective ground conductor contact 20, the cooling device 30 and the protective ground conductor connection 32 are therefore arranged such that the protective ground conductor contact 20 is galvanically conducted to the protective ground conductor 32 by means of the cooling device 30. Ultimately, the galvanic connection of the protective ground conductor contact 20 to the protective ground conductor 120 is realized by means of the cooling device 30, so that without the cooling device 30 there would be no such galvanic connection between the protective ground conductor contact 20 and the protective ground conductor 120 and, accordingly, no grounding of the charging plug 100. The galvanic connection between the protective ground conductor contact 20 and the protective ground conductor connection 32 and thus ultimately to the protective ground conductor 120 is therefore implemented by the cooling device 30 being arranged between the protective ground conductor contact 20 and the protective ground conductor connection 32 and connecting these to one another.

The protective ground conductor 120 is arranged in the supply cable 140. The supply cable 140 additionally comprises at least the two cable lines (not shown here) which are galvanically connected to the two power contacts 10. The charging lines and the protective ground conductor 120 are thus arranged together in the supply cable 140.

Accordingly, by inserting the contact pin of the power contact 10 (first connection region) into a contact socket (not shown in the drawings), a charging current can be transferred, for example from a charging station via the charging lines, the power contacts 10 (contact pins) and the contact sockets to an accumulator, such as a vehicle battery of an electrically operated vehicle.

The plug-in direction R of the charging plug 100 can also be seen in FIGS. 2A and 2B, as in FIG. 1. The plug-in direction R is understood to mean the direction in which the charging plug 100, in the assembled state, is coupled to a corresponding connection device as intended. The plug-in direction R extends in parallel to a direction defined by one of the power contacts 10 and to a direction defined by the protective ground conductor contact 20. The plug-in direction R also extends perpendicularly with respect to the front contact face 115 of the charging plug housing 110 and perpendicularly with respect to the front face 37 of the cooling device 30.

Figure 3A:
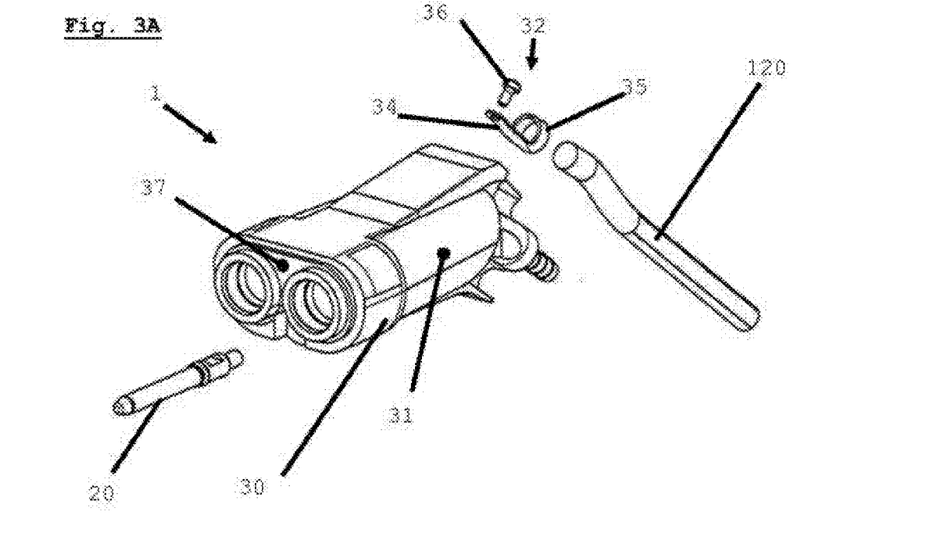
FIG. 3A is an exploded view of the protective grounding and cooling system shown in FIG. 2A, the supply cable not being shown except for the protective ground conductor.
Figure 3B:
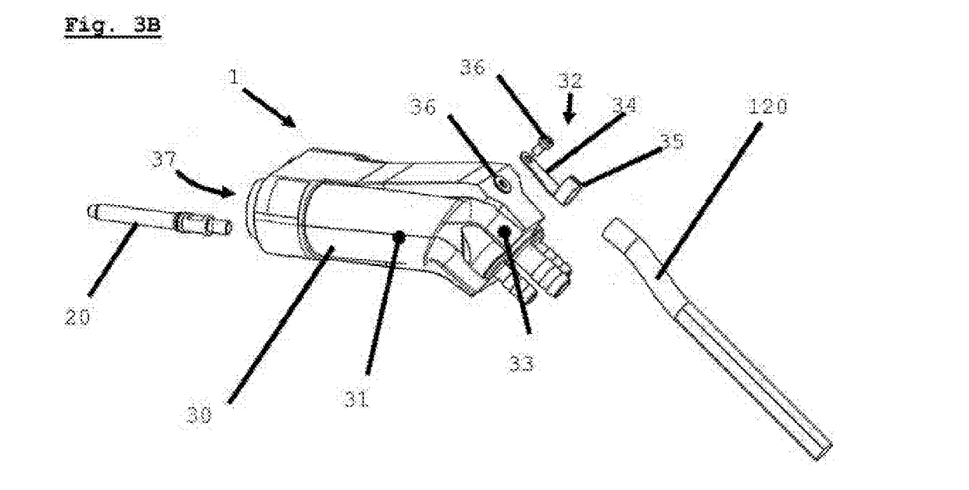
FIG. 3B is an exploded view of the protective grounding and cooling system shown in FIG. 2B, the supply cable not being shown except for the protective ground conductor.

FIGS. 3A and 3B are each an exploded view of the protective grounding and cooling system 1 according to the invention, the view in FIG. 3A corresponding to the view in FIG. 2A and the view in FIG. 3B corresponding to the view in FIG. 2B, in each case with the supply cable 140 omitted. In addition to the protective grounding and cooling system 1, only the protective line 120 is shown separately.

As shown in the exploded views in FIGS. 3A and 3B, the protective ground conductor connection 32 is attached to the cooling device 30 from above; more specifically, the protective ground conductor connection 32 is connected to the cooling device 30, namely to the cable-side end portion 33 of the cooling device 30, from above by means of the screw connection 36. It is also possible to make this screw connection 36 even more secure by implementing the screw connection 36, for example, by screwing using additional parts, such as a tooth lock washer.

The cable-side end portion 33 remote from the front face 37 of the cooling device 30 is angled downward. More specifically, the cable-side end portion 33 is angled with respect to the plug-in direction R defined by the protective ground conductor contact 20, as can be seen in FIGS. 2A and 2B, such that the cooling device 30 and thus also the protective grounding and cooling system 1 are designed so as to be adapted to the subsequent profile of the supply cable 140. In this way, the protective grounding and cooling system 1 has an advantageous design with regard to usability of the corresponding charging plug 100. In addition, the protective grounding and cooling system 1 therefore ensures improved cooling of the charging plug 100 by making optimal use of the space available in the charging plug housing interior 116 by means of the cooling device 30, thus ensuring an increased current-carrying capacity and simultaneously a more compact design of the charging plug 100. Because a guiding of the protective ground conductor 120 extending through a large part of the charging plug housing interior 116 can be dispensed with, the operational safety of the charging plug 100 is simultaneously improved.

Figure 4A:
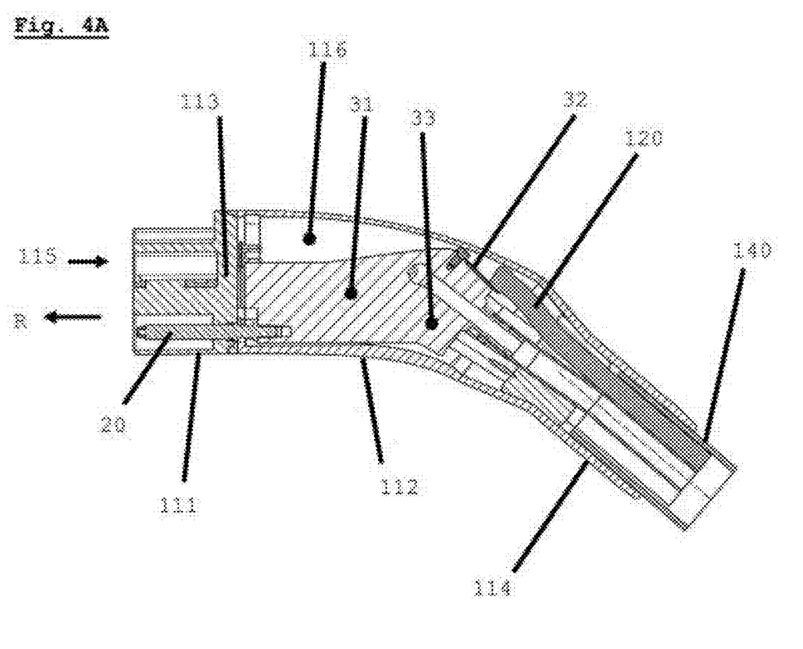
FIG. 4A is a sectional view of the charging plug shown in FIG. 1.
Figure 4B:
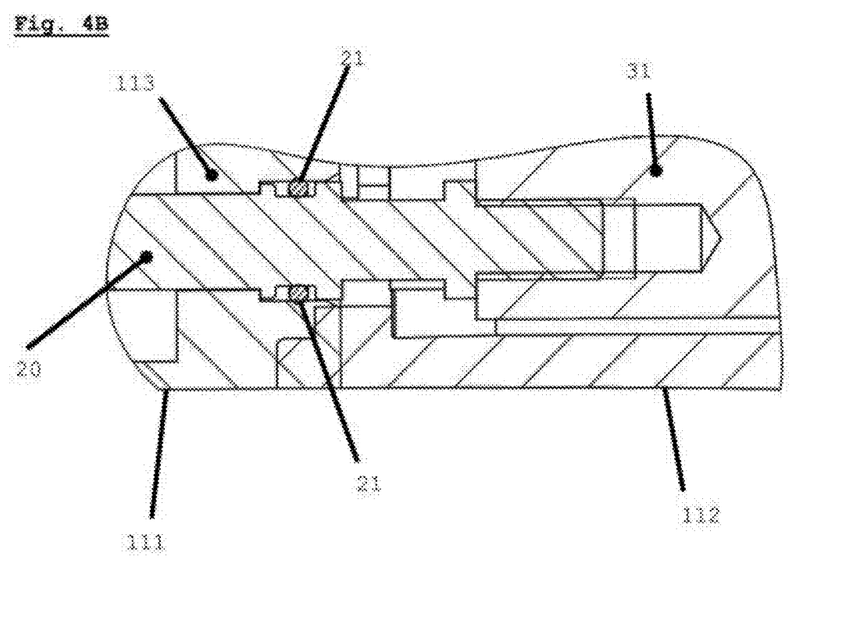
FIG. 4B is a detailed view of the charging plug from FIG. 4A.

FIG. 4A is a sectional view of the charging plug 100 according to the invention with the protective grounding and cooling system 1 according to the invention. The charging plug 100 from FIG. 1 is shown as cut by a vertical sectional plane extending through the center of the charging plug 100. FIG. 4B is an enlarged detail view of a section of FIG. 4A.

The supply cable 140 comprising the protective ground conductor 120 is connected to the charging plug 100 by, inter alia, being inserted into the cable connection portion 114 and being enclosed thereby. The protective ground conductor 120 is also galvanically connected at least in part to the heat sink 31 of the cooling device 30 via the protective ground conductor connection 32. This cooling device 31 is in turn galvanically connected at least in part to the protective ground conductor contact 20 penetrating, at its front face, the base portion 113 of the connector face portion 111 of the charging plug housing 110, thus producing a galvanic connection of the protective ground conductor 20 to the protective ground conductor 120 by means of the cooling device 30.

As is clear from the detail view in FIG. 4B, the front face of the protective ground conductor contact 20 penetrates the base portion 113 of the connector face portion 111, said contact being sealed against the charging plug housing 110 at the same time by means of a seal 21 extending between the protective ground conductor contact 20 and the base portion 113 of the connector face portion 111. It is also clear from FIG. 4B that the protective ground conductor contact 20 is screwed into the heat sink 31, more specifically into the front face 37 of the cooling device 30.

The heat sink 31 and therefore the cooling device 30 are arranged in the cable-side portion 112 of the charging plug housing 110. The charging plug 100 shown is particularly advantageous in terms of its size and thus its usability due to the protective grounding and cooling system 1 making optimal use of the charging plug housing interior 116. As is clear in FIG. 4A in particular, a guiding of the protective ground conductor 120 through the charging plug housing 110 that takes up additional installation space has been dispensed with, since the protective ground conductor 120 is not directly connected to the protective ground conductor contact 20, but is galvanically connected to the protective ground conductor contact 20 by means of the cooling device 30.

LIST OF REFERENCE SIGNS 1 protective grounding and cooling system
10 power contact/electrical connection body
20 protective ground conductor contact/PE contact/grounding contact element
21 seal
30 cooling device
31 heat sink
32 protective ground conductor connection/neutral conductor connection/cable ring lug
33 cable-side end portion (of the cooling device)
34 flat connection portion (of the protective ground conductor connection)
35 annular conductor portion (of the protective ground conductor connection)
36 screw connection
37 front face (of the cooling device)
100 charging plug/(charging) plug-in connector
100_1 front region (of the charging plug)
100_2 rear region (of the charging plug)
110 charging plug housing/(charging) plug-in connector housing
111 connector face portion (of the charging plug housing)
112 cable-side portion (of the charging plug housing)
113 base portion (of the connector face portion)
114 cable connection portion (of the cable-side portion of the charging plug housing)
115 front contact face (of the charging plug housing)
116 charging plug housing interior
120 protective ground conductor/neutral conductor
140 supply cable/charging cable
R plug-in direction (of the charging plug)

The invention claimed is:

1. A protective grounding and cooling system for a charging plug, comprising:
at least one protective ground conductor contact for galvanic connection to a protective ground conductor, and
at least one cooling device for dissipating heat generated in the charging plug, the cooling device being galvanically connected to the protective ground conductor contact at least in part,
wherein:
the cooling device has a protective ground conductor connection for at least partial galvanic connection to the protective ground conductor, and
the protective ground conductor contact, the cooling device, and the protective ground conductor connection are arranged such that the protective ground conductor contact is galvanically connected to the protective ground conductor connection by means of the cooling device.

2. The protective grounding and cooling system according to claim 1, wherein the cooling device is designed as a fluid-cooled heat sink.

3. The protective grounding and cooling system according to claim 1, wherein the cooling device is designed as a heat sink made substantially of a thermally conductive material.

4. The protective grounding and cooling system according to claim 1, wherein the protective ground conductor contact is directly connected to the cooling device at a front face of the cooling device for at least partial galvanic connection to the cooling device.

5. The protective grounding and cooling system according to claim 4, wherein the protective ground conductor contact is screwed into the front face of the cooling device.

6. The protective grounding and cooling system according to claim 1, wherein the protective ground conductor connection is connected to the cooling device by means of a screw connection.

7. The protective grounding and cooling system according to claim 1, wherein the protective ground conductor connection is designed as a cable ring lug.

8. The protective grounding and cooling system according to claim 1, wherein the protective ground conductor connection is arranged on a cable-side end portion of the cooling device remote from a front face of the cooling device.

9. The protective grounding and cooling system according to claim 8, wherein the cable-side end portion of the cooling device is angled with respect to a plug-in direction defined by the protective ground conductor contact.

10. A charging plug for coupling to a corresponding connection device and for transmitting electrical energy, comprising:
    at least one power contact having a first connection region for galvanic connection to an electrical energy recipient and having a second connection region galvanically connected to a charging line; and
    at least one protective grounding and cooling system according to claim 1, the at least one protective grounding and cooling system arranged in a charging plug housing, the protective ground conductor connection of the cooling device being galvanically connected to a protective ground conductor.

11. The charging plug according to claim 10, wherein the charging line and the protective ground conductor are arranged together in a supply cable.

12. The charging plug according to claim 10, wherein the charging plug housing is formed of a cable-side portion nearer the charging line and the protective ground conductor and a connector face portion remote from the charging line and the protective ground conductor, such that the connector face portion plugs onto the front face of the cable-side portion in a plug-in direction (R) defined by the protective ground conductor contact.

13. The charging plug according to claim 12, wherein the cooling device is arranged in the cable-side portion of the charging plug housing and the front face of the protective ground conductor contact penetrates a base portion of the connector face portion of the charging plug housing.

14. The charging plug according to claim 13, wherein the protective ground conductor contact is sealed against the charging plug housing by means of a seal extending between the protective ground conductor contact and the base portion of the connector face portion.

15. A charging station for discharging electrical energy to a recipient of electrical energy, the charging station comprising a charging plug according to claim 10, the charging plug being electrically connected to the charging station by means of a supply cable.

* * * * *